United States Patent [19]

Frötschner et al.

[11] Patent Number: 4,825,521

[45] Date of Patent: May 2, 1989

[54] METHOD OF MAKING AN EXTERNAL SHELL OF A PUMP WHEEL OF A HYDRODYNAMIC FLOW UNIT

[75] Inventors: Eberhard Frötschner, Gerlingen; Hans Merkle, Stuttgart; Otto Wörner, Reutlingen, all of Fed. Rep. of Germany

[73] Assignee: Daimler-Benz Aktiengesellschaft, Stuttgart, Fed. Rep. of Germany

[21] Appl. No.: 43,454

[22] Filed: Apr. 28, 1987

[30] Foreign Application Priority Data

Apr. 29, 1986 [DE] Fed. Rep. of Germany ....... 3614504

[51] Int. Cl.[4] .............................................. B23P 15/00
[52] U.S. Cl. ......................... 29/156.4 R; 29/156.8 R; 60/330; 228/162; 228/184; 416/180
[58] Field of Search ................. 29/156.8 R, 156.8 FC, 29/156.4 R; 60/330, 361; 228/162, 184; 416/180; 72/340, 379

[56] References Cited

U.S. PATENT DOCUMENTS

| | | | |
|---|---|---|---|
| 3,316,622 | 5/1967 | Jandasek | 416/180 X |
| 3,981,614 | 9/1976 | Helmer | 416/180 |
| 4,512,115 | 4/1985 | Miller | 51/289 R |
| 4,580,368 | 4/1986 | Smith | 51/289 R X |
| 4,665,693 | 5/1987 | Misu et al. | 416/180 X |
| 4,704,864 | 11/1987 | Frötschner et al. | 60/330 |

FOREIGN PATENT DOCUMENTS 2910111 9/1980 Fed. Rep. of Germany ........ 60/330
2108411 5/1983 United Kingdom ........... 29/156.8 R

OTHER PUBLICATIONS

*Fottinger-Kupplungen und Fottinger-Getreibe*; Kickbusch; Springer-Verlag, Berlin; 1963.
Oehler, Dr.-Ing. habil. Gerhard, "Konstruktionsbücher"-Gestaltung gezogener Blechteile, Springer-Verlag, Berlin/Heidelberg/New York, 1966.
Niemann, G., "Maschinenelemente"-Band I Konstruktion und Berechnung von Verbindungen, Lagern, Wellen, Springer-Verlag, Berlin/Heidelberg/New York, 1975.
Gimmler, Joachim, "Aufbau und Auslegung des Föttinger-Wandlers für Kraftfahrzeuge", pp. 97–103, 1970.

*Primary Examiner*—Howard N. Goldberg
*Assistant Examiner*—Andrew E. Rawlins
*Attorney, Agent, or Firm*—Barnes & Thornburg

[57] ABSTRACT

An external shell of a pump wheel of a hydrodynamic flow unit manufactured from a sheet metal pressed part has, in its outlet-side region, an integral connecting sleeve with a cylindrical centering surface and a centered fastening surface extending therefrom, and wherein the connecting sleeve is formed by upsettingly deforming, with the fastening surface being given a cylindrical shape and the centering surface being machined to its required diameter after upsettingly deforming.

3 Claims, 2 Drawing Sheets

METHOD OF MAKING AN EXTERNAL SHELL OF A PUMP WHEEL OF A HYDRODYNAMIC FLOW UNIT

BACKGROUND AND SUMMARY OF THE INVENTION

The invention concerns an external shell of a centrifugal flow pump wheel of a hydrodynamic flow unit and its method of making, wherein the shell has a toroidal internal surface, a constant wall thickness in its central region, and an integral connecting sleeve portion with a centering surface connected to a fastening surface portion with a centering surface connected to a fastening surface at its outside region.

In known triple location converter (Design Books No. 21 "Fottinger-Kupplungen und Fottiner-Getriebe" by Dipl.-Ing. E. Kickbusch; Springer-Verlag Berlin/-Gottingen/Heidelberg 1963; Page 1, FIG. 1/1), an external shell of the type mentioned at the beginning is designed as a heavy cast part in which the fastening surface is located in a radial plane, normal to the axis of rotation, of a flange section. This flange section has bolt penetrations radially outside a centering surface and located parallel to the axis of rotation for the bolt fastening to the mating flange of the drive-side converter cover. Whereas the wall thickness in the region between the flange section having the bolt penetrations and the entry-side connecting sleeve of this known outer shell remains substantially constant, its wall thickness in the region of the centering surface is reduced because the drive torque is introduced into the pump wheel via the radial flange section having the bolt penetrations. This gives an undesirably large converter external diameter. However, in this known external shell, a sharp-edged transition between the outlet-side end of the inner surface and an end surface located in a radial plane normal to the axis of rotation of the outlet-side connecting sleeve is already provided so that it can be assumed that the flow losses at the transition between the pump and turbine wheels are kept small.

The subject matter of an unpublished German patent application shows a spoke for connecting a wheel hub with an outer ring of a drive spoke wheel for a hydrodynamic torque converter. The internal shell of the centrifugal flow pump wheel is connected, for the purpose of distributing the power, by means of a rotating spring connection located in the internal toroid which has no flow, to the outer ring. The external shell of the pump wheel is attached by a weld connection to the mating sleeve, overlapping the outlet-side connecting sleeve of the shell with cylindrical shaping of the centering surface and the fastening surface, of a drive-side converter cover. No information is given in the patent application with respect to the material and manufacture of the external shell.

An object of which the instant invention is based, consists essentially in providing a sharp-edged transition at the outlet-side end of the inner surface to a radial end surface of the connecting sleeve, in an outer shell of a centrifugal flow pump wheel while keeping weight and dimensions small.

In an external shell of a centrifugal flow pump wheel of a hydrodynamic flow unit having a toroidal internal surface and a constant wall thickness in its central region and with an integral connecting sleeve portion at its outlet-side region and with the integral connecting sleeve portion having a cylindrical centering surface and a fastening surface extending from the centering surface, an external shell according to the instant invention is obtained by having: (1) the external shell being formed from a sheet metal pressed part; (2) the connecting sleeve being created by upsettingly deforming the sheet metal part wherein the fastening surface is given a cylindrical shape and the centering surface is machined to its required diameter (27) after being upsettingly deformed; (3) the required diameter being greater by twice the constant wall thickness than the diameter, of a reference circle centered about the axis of rotation of the external shell of the hydrodynamic flow unit (14—14); and wherein (4) the circle is defined by the intersection (15) of the internal toroidal surface (7) with a reference plane (17—17) normal to the axis of rotation of the external shell and containing the center (16) of the internal toroidal surface (7).

Additional advantageous embodiments of the external shell in accordance with the invention are obtained by only having a portion of the wall thickness upsettingly deformed. Also advantageous is the locating of a strip groove concentric with the axis of rotation of the shell.

The following advantages are achieved by means of the invention:

Because of the sheet metal pressed part design, the manufacture of the external shell is made cheaper and its weight is kept low; and the wall thickness between the centering surface and the internal surface is substantially greater than the normal wall thickness of the external shell, whose length is additionally increased by upsettingly deforming procedure.

In order to increase the strength and stiffness of the external shell/converter cover structural unit, the invention contemplates that the mating sleeve of a torque converter cover overlaps both a centering surface and a fastening surface at the connecting sleeve of an external shell of the torque converter and is then fixed by a weld seam between the fastening surface and an end of the cover.

These measures achieve the effect that the otherwise conventional means of compensating for the axial clearance between a radially inner hub flange of a torque converter cover and a radially inner, i.e., entry-side, connecting sleeve of the outer shell of the torque converter pump wheel become unnecessary, because hydraulic pressures in the torque converter can no longer have the effect of causing marked "stretching" of the structural unit mentioned - as occurs in the case of known converters or couplings.

The invention provides for maintaining circularity of the outer shell of the torque converter pump wheel or admitting of only a slight loss of circularity even after a brazing fastening procedure of the pump vanes to the pump shell and thus out-of-balance of the converter, is therefore reduced.

The sharp-edged nature of the outlet-side end of the internal surface of the pump shell of the torque converter is also ensured in the external shell according to the invention by upsettingly deforming procedure and/or by turning over of the connecting sleeve.

The retention of the shape of the sheet metal pressed part during the upsettingly deforming process is facilitated by stop grooves in the external surface of the external shell. The expedient of using only part of the wall thickness of the external shell of the torque converter pump for forming the connecting sleeve by upsettingly deforming, also leads to smaller upsetting forces and therefore easier retention of the shape of the sheet metal pressed part during the upsettingly deforming procedure.

These and other objects, features, and advantages of the present invention will become more apparent from the following description when taken in connection with the accompanying drawings which show, for the purposes of illustration only, plural embodiments in accordance with the present invention, and wherein:

DETAILED DESCRIPTION OF THE DRAWINGS

Figure 1:
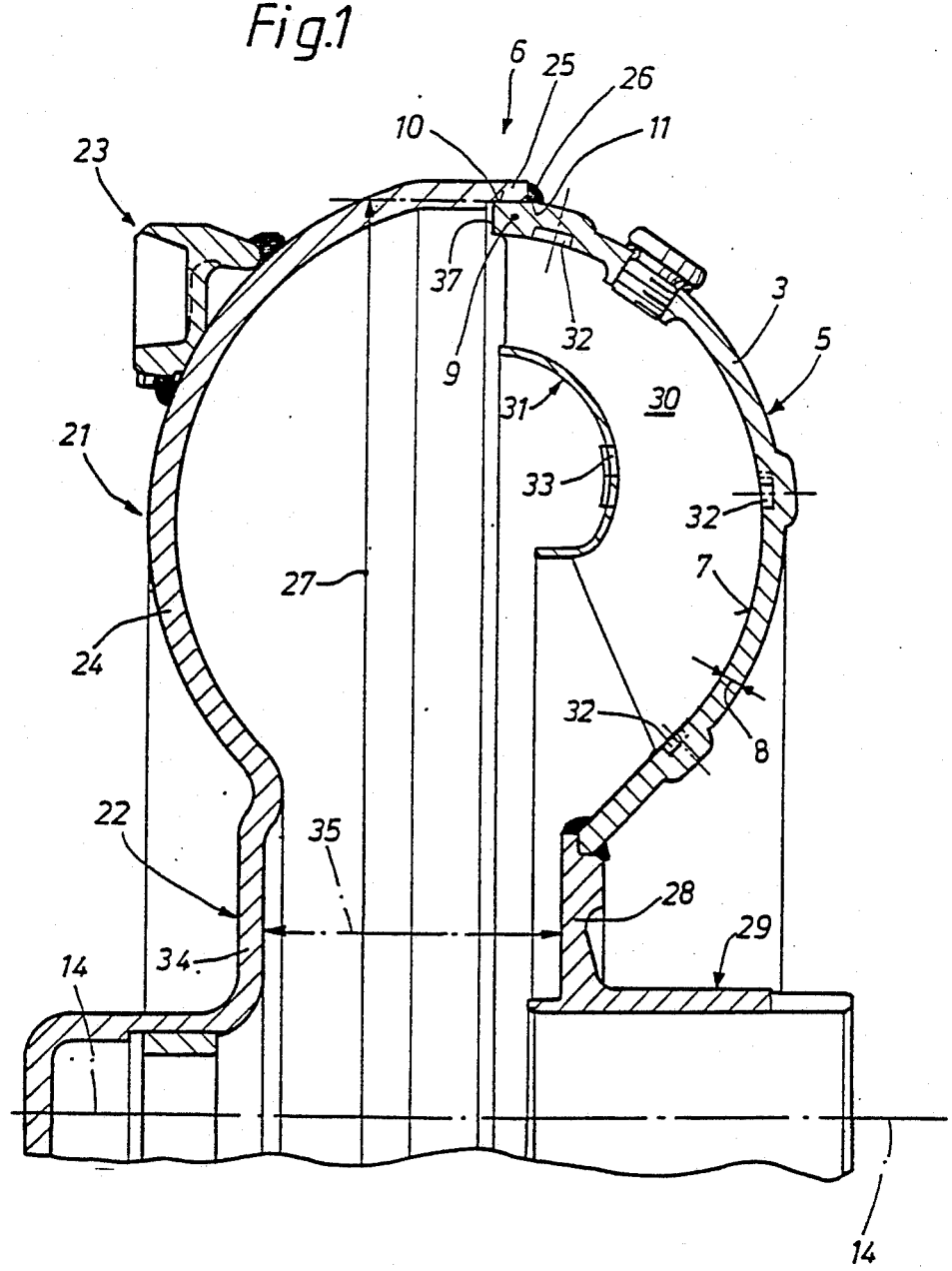
FIG. 1 denotes a partial section, containing the axis of the rotation, through a structural unit of a hydrodynamic torque converter having a pump wheel with an external shell according to the invention in a first embodiment form and a torque converter cover connection thereto and FIG. 2 denotes a partial section, corresponding to the view of FIG. 1, through an external shell in accordance with the invention of a second embodiment form in which the end portion of the external shell is formed with a stepped end portion.

Referring now to the drawings wherein like reference numerals are used to designate like parts and more particularly to FIG. 1, a torque converter cover 21 is rotationally and symmetrically provided about a central axis of rotation 14—14 of a hydrodynamic torque converter 6. The torque converter cover 21 is provided with a radially inner hub 22 for supporting a turbine wheel shaft; radially outer fastening bosses 23 for rotationally solid connection to a crankshaft of an internal combustion engine (not shown); and a central toroidal shell part 24 for accepting a turbine wheel (not shown).

The radially outer edge region of the torque converter cover 21 is designed as a mating sleeve 25 which is centered on a cylindrical centering surface 10 of a connecting sleeve portion 9 of an external shell 3 of a torque converter pump. The connecting sleeve portion 9 has a cylindrically shaped outer fastening surface 11 extending to the right of the centering surface 10 as shown in FIG. 1. A weld seam 26 is applied between the abutting radial end face of the mating sleeve 25 and the fastening surface 11 for making a rotationally solid connection of the torque converter cover 21 and external pump shell 3.

On its radially inner end (i.e., entry-side), the external shell 3 of the pump portion of the torque converter is solidly welded to a rotational radial flange 28, which is integral with a hollow shaft 29 so as to be highly resistant to pressure forces internally of the shell 3. The external shell 3 has a constant wall thickness 8 in its region located between the fastening surface 11 and flange 28.

The external shell 3 is part of a torque converter pump wheel 5 and has, for this purpose, a toroidal internal surface 7 on which pump vanes 30 are held stationary at positions 32 by means of a single brazed connection 33 at their inner edges on a toroidal inner shell 31. The parts 3, 30 and 31 thus brazed together form a rigid component.

The manufacture and shaping of the connecting sleeve 9, in accordance with a feature of the invention is described in detail below in association with the external shell 4 of the FIG. 2 embodiment and ensures that the distance 35, measured in the directions of the axis of rotation 14—14 between the radial flange 28 of the external shell 3 and the radial flange 34 of the hub 22 of the converter cover 21, is not substantially increased, even at higher internal pressures in the converter 6, so that there is no need for special measures to compensate for the axial clearance between the two flange parts 28 and 34. Similarly, the higher strength and the increased stiffness of the connection location 9, 25, 26 ensures that the deformations of the external shell 3 at the positions 32 due to the effects of heat during brazing remain small so that any out-of-balance condition due to manufacture of the torque converter cover and pump wheel structural unit 3, 21 is also small.

Figure 2:
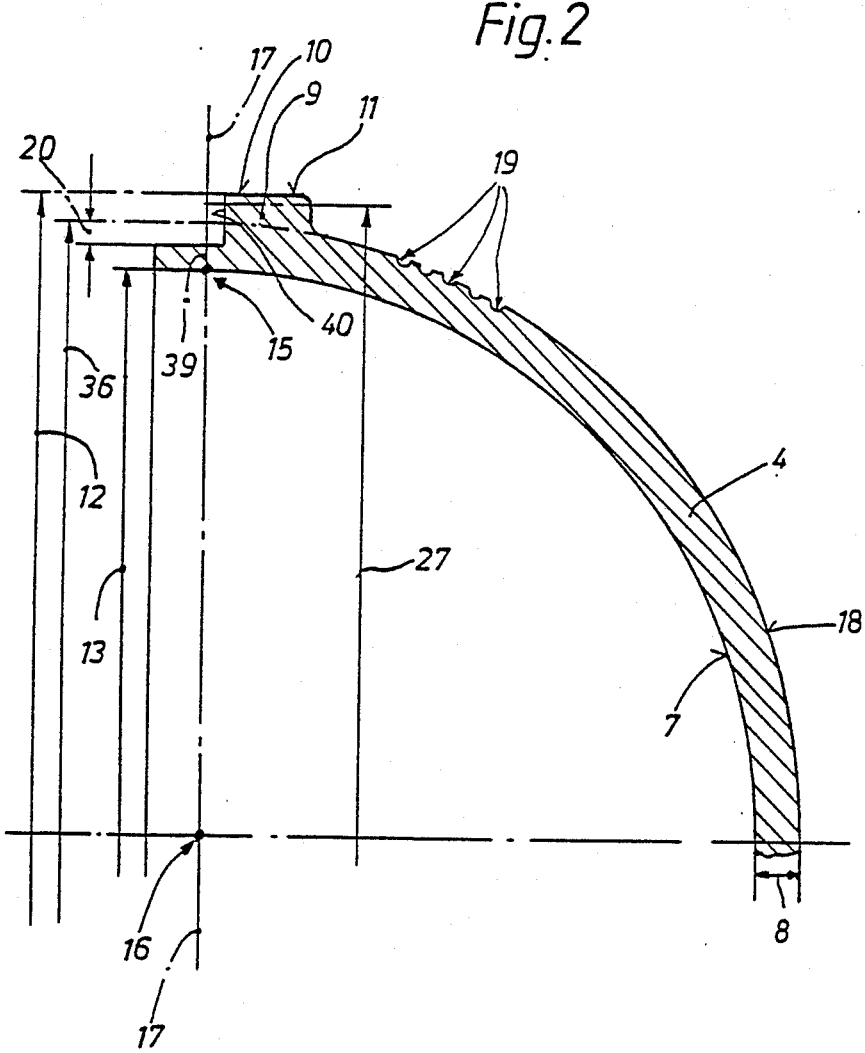

Referring to FIG. 2, an external shell 4 that can be used instead of the external shell 3 in the torque converter 6 of FIG. 1 can also be welded to a radial flange 28 of a hollow shaft 29 and consequently agrees with the external shell 3 of FIG. 1 in the following features:

a connecting sleeve 9 with one cylindrical centering surface 10 and one fastening surface 11, is provided at the outlet-side end. The external shell 4 has a toroidal internal surface 7 and a constant wall thickness 8 in its central region. After the upsettingly deforming process—in which an annular punch acts at the radially outer end of the external shell 4 in a direction toward the axis of rotation 14—14 pointing towards the radially inner end of the external shell 4—the centering and fastening surfaces 10 and 11 initially have a diameter 12 which is greater than the required value 27. After upsettingly deforming process, however, this diameter is reduced to the required diameter 27 by machining and this diameter is still larger than the diameter 36 of the external surface 18 of the external shell 4. As is indicated by the position of the appropriate intersection points—for example the intersection point 15 of the internal surface 7; with the diameter 13 located at the left hand side in the plane of the FIG. 2 drawing, in the reference plane 17-17 normal to the axis of rotation, containing the center 16 of the inner surface 7 and the outer surface 18. It follows naturally that, for a constant wall thickness 8, the diameter 36 is larger—by twice this wall thickness than the diameter 13.

Just as in the external surface 18 of the external shell 4, stop grooves 19 running concentric to the axis of rotation 14—14 can also be provided in the external shell 3 of FIG. 1; these grooves do not, however, have to run over the complete periphery of the external shell but are preferably interrupted. These stop grooves 19 ease the tensional forces built up in the sheet metal external shell during the deformation process.

In the external shell 3 of FIG. 1, the whole of the wall thickness 8 is subjected to the deforming procedure during the upsettingly deforming of the connecting sleeve 9, thus providing a through radial end surface 37, which can also be turned to form a sharp-edged transition with the internal surface 7 of the shell 3. This sharp-edged transition is important for reducing the flow or pressure losses at the transfer of the working medium from the pump vanes 30 into the turbine vanes of the turbine wheel (not shown).

In the FIG. 2 embodiment only a part 20 of the wall thickness 8 is used for the upsettingly deformation process for creating the connecting sleeve 9 in the external shell 4, so that two axially mutually stepped end surfaces 39 and 40 are formed, of which the radially inwards located end surface 39 is finish-machined by turning to form the sharp-edged transition, already mentioned, to the internal surface 7.

While we have shown and described plural embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

What is claimed is:

1. A method of forming an external shell of a centrifugal flow pump wheel of a hydrodynamic flow unit having a toroidal internal surface and a constant wall thickness in its central region and with an integral connecting sleeve portion at its outlet-side region; the integral connecting sleeve portion having a cylindrical centering surface and a fastening surface extending from the centering surface, the improved method comprising: forming the external shell from a sheet metal part which is first pressed and then forming the connecting sleeve by deforming by an upsetting process the pressed sheet metal part to give the fastening surface a cylindrical shape; then machining the centering surface to its required diameter which is greater by at least twice the constant wall thickness than the diameter of a reference circle centered about the axis of rotation of the external shell of the hydrodynamic flow unit when the circle is defined by the intersection of the internal toroidal surface with a reference plane normal to the axis of rotation of the external shell and containing the center of the internal toroidal surface.

2. A method according to claim 1, wherein only a part of the original wall thickness is subjected to the deforming by an upsetting process.

3. The method according to claim 1, including the step of forming at least one stop groove on the external surface, said stop groove being concentric with the axis of rotation.

* * * * *